(12) United States Patent
Uhl et al.

(10) Patent No.: US 7,137,877 B2
(45) Date of Patent: Nov. 21, 2006

(54) MANUALLY OPERATED TOOL

(75) Inventors: Klaus-Martin Uhl, Baltmannsweiler (DE); Sebastian Friedrich, Waiblingen (DE)

(73) Assignee: Andreas Stihl AG & Co KG (DE)

( * ) Notice: Subject to any disclaimer, the term of this patent is extended or adjusted under 35 U.S.C. 154(b) by 0 days.

(21) Appl. No.: 10/861,843

(22) Filed: Jun. 4, 2004

(65) Prior Publication Data

US 2004/0248506 A1     Dec. 9, 2004

(30) Foreign Application Priority Data

Jun. 6, 2003    (DE) ................................ 103 25 663

(51) Int. Cl.
   *B24B 27/08*    (2006.01)
(52) U.S. Cl. ....................... 451/358; 451/359; 451/451
(58) Field of Classification Search ................ 451/359, 451/358, 360, 451–454; 408/118; 30/122, 30/123, 390
   See application file for complete search history.

(56) References Cited

U.S. PATENT DOCUMENTS

| 3,513,888 A | * | 5/1970 | Welsh et al. .................. 30/390 |
| 3,585,106 A | * | 6/1971 | Dobbertin ................... 162/252 |
| 3,735,489 A | * | 5/1973 | Zatorsky, Jr. ................ 30/390 |
| 3,893,240 A | * | 7/1975 | Morner et al. ................ 30/390 |
| 4,809,438 A | * | 3/1989 | Nagashima et al. .......... 30/390 |
| 5,730,561 A |   | 3/1998 | Wambeke |

FOREIGN PATENT DOCUMENTS

DE       38 41 644       12/1997

* cited by examiner

*Primary Examiner*—Dung Van Nguyen
(74) *Attorney, Agent, or Firm*—Robert W Becker & Associates; Robert W Becker

(57) ABSTRACT

A manually operated implement, in particular a parting-off grinder or similar device is provided. The implement has a bracket which has a first end, which is fixed to the housing of the tool, and a second end to which is fixed a spindle which drives, for example, a metal cutting tool. The spindle is driven by a drive wheel via a belt drive. A bracket of high rigidity at low overall weight can be achieved if the bracket is designed as one piece and can be fixed to the housing in at least two positions.

14 Claims, 3 Drawing Sheets

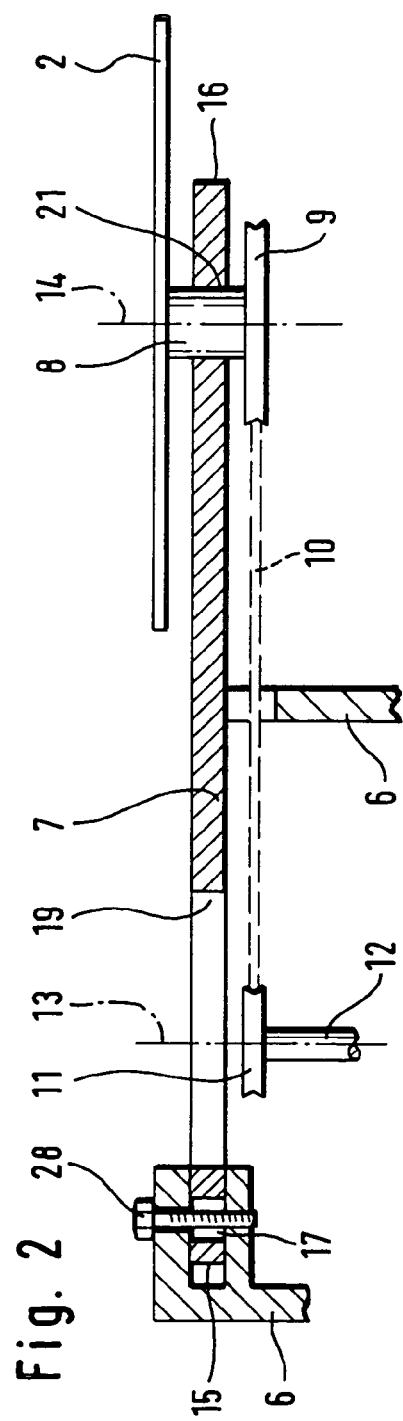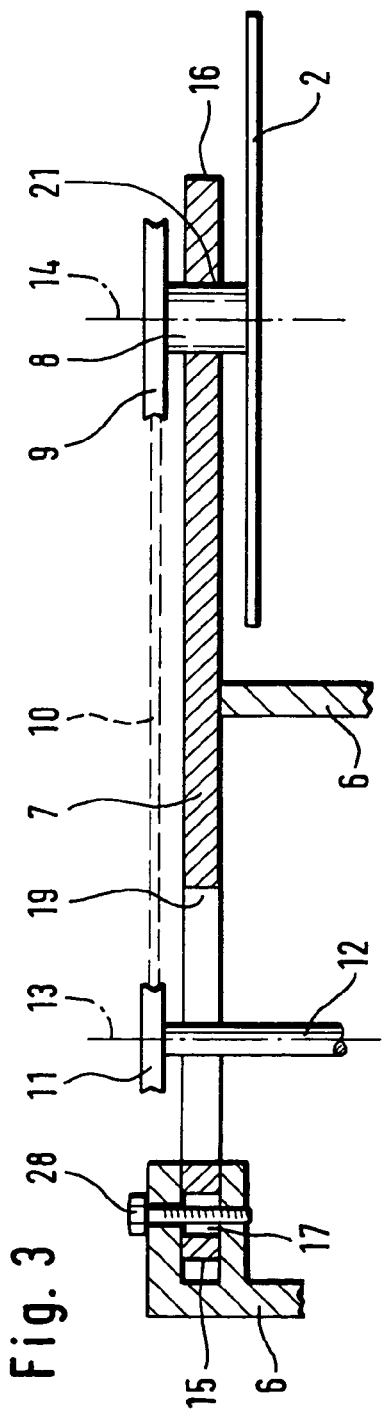

MANUALLY OPERATED TOOL

BACKGROUND OF THE INVENTION

Figure 1:
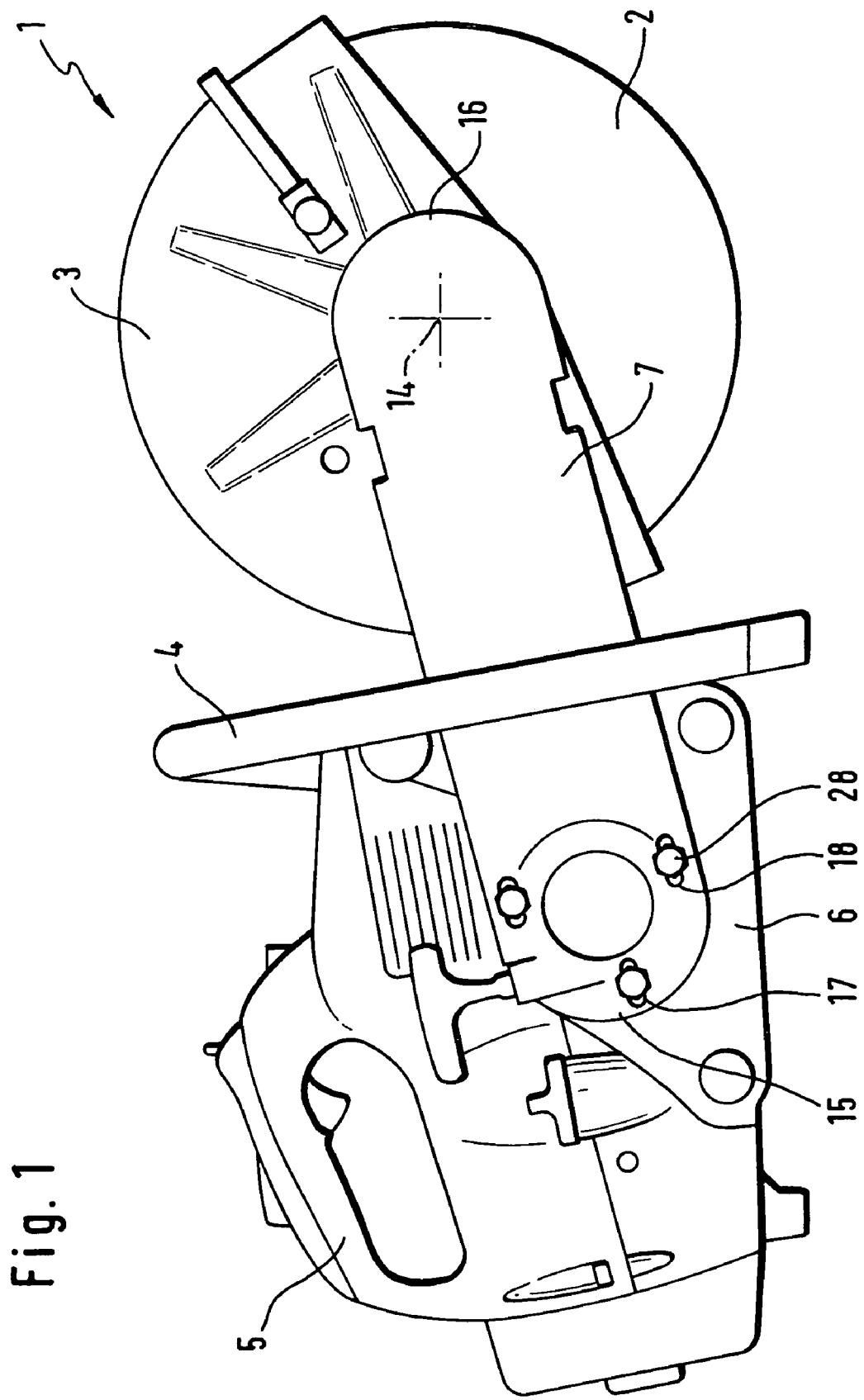

The invention relates to a manually operated implement or tool, in particular a parting-off grinder or similar device.

A parting-off grinder with a bracket is known from DE 38 41 644 C2. The bracket is fabricated in two pieces with a belt-tensioning device operating between the two parts of the bracket. When the tool is in operation, the bracket is subject to high mechanical strains since all the machining forces are conducted through the bracket. Due to the division of the bracket into two parts, a sturdy design is required in order to achieve sufficient mechanical stability. This results in a heavy weight tool.

The object of the invention is to create a tool of the aforementioned general type, which has good mechanical stability and is lightweight.

This object is achieved by means of an implement having a monolithic bracket having a first end that is secureable to the implement housing in at least two positions, and a second end on which is disposed a spindle for driving a tool, wherein the spindle is adapted to be driven by a drive wheel via a belt drive.

The one-piece or monolithic design of the bracket results in significantly higher stability and rigidity. A one-piece bracket is thus able to achieve sufficient rigidity at a light overall weight. Since it is possible to fix the bracket to the tool in several positions, the belt can be tensioned and changed to a further position during operation.

The bracket is advantageously fixed to the housing by means of a fixing and when the fixing is released it can be moved along the housing within a predetermined range. The ability to move the bracket along the housing permits optimum tensioning of the belt, which runs between the drive wheel, which is fixed to the housing, and the spindle, which is fixed, to the bracket. A simple design can be achieved if the fixing comprises at least one elongated hole or slot in the bracket through which a fixing means is able to pass.

The bracket is provided with an opening in the area of the first end. The bracket is advantageously designed to be symmetrical to a plane which contains the axes of rotation of the drive wheel and the spindle axis. The symmetrical design permits the bracket to be fixed to the tool in positions rotated about the longitudinal direction of the bracket by 180°. This means that the tool can be positioned both on the side of the bracket facing the housing and on the side facing away from it. In the area of the second end the bracket advantageously has a hub for mounting the spindle. The bracket is provided with a receiver for a belt-tensioning device. The belt-tensioning device permits the belt to be tensioned quickly and simply. In this arrangement, the tensioning device operates between the bracket and the housing. The positioning of the belt-tensioning device in a receiver in the bracket results in a simple, compact design.

The bracket expediently has two guide channels in which the belt runs. The guide channels run in particular on either side of the receiver and approximately in the longitudinal direction of the bracket. The belt-tensioning device is thus positioned in the area between the two sections of the belt, thereby producing a compact arrangement.

The bracket is expediently designed as a cast part. In order to achieve high rigidity at a lightweight, the belt is provided with reinforcing struts in at least one area. The bracket expediently has reinforcing struts in an area between a guide channel and the edge of the bracket. In particular, the bracket has reinforcing struts in the areas surrounding the opening.

Figure 4:
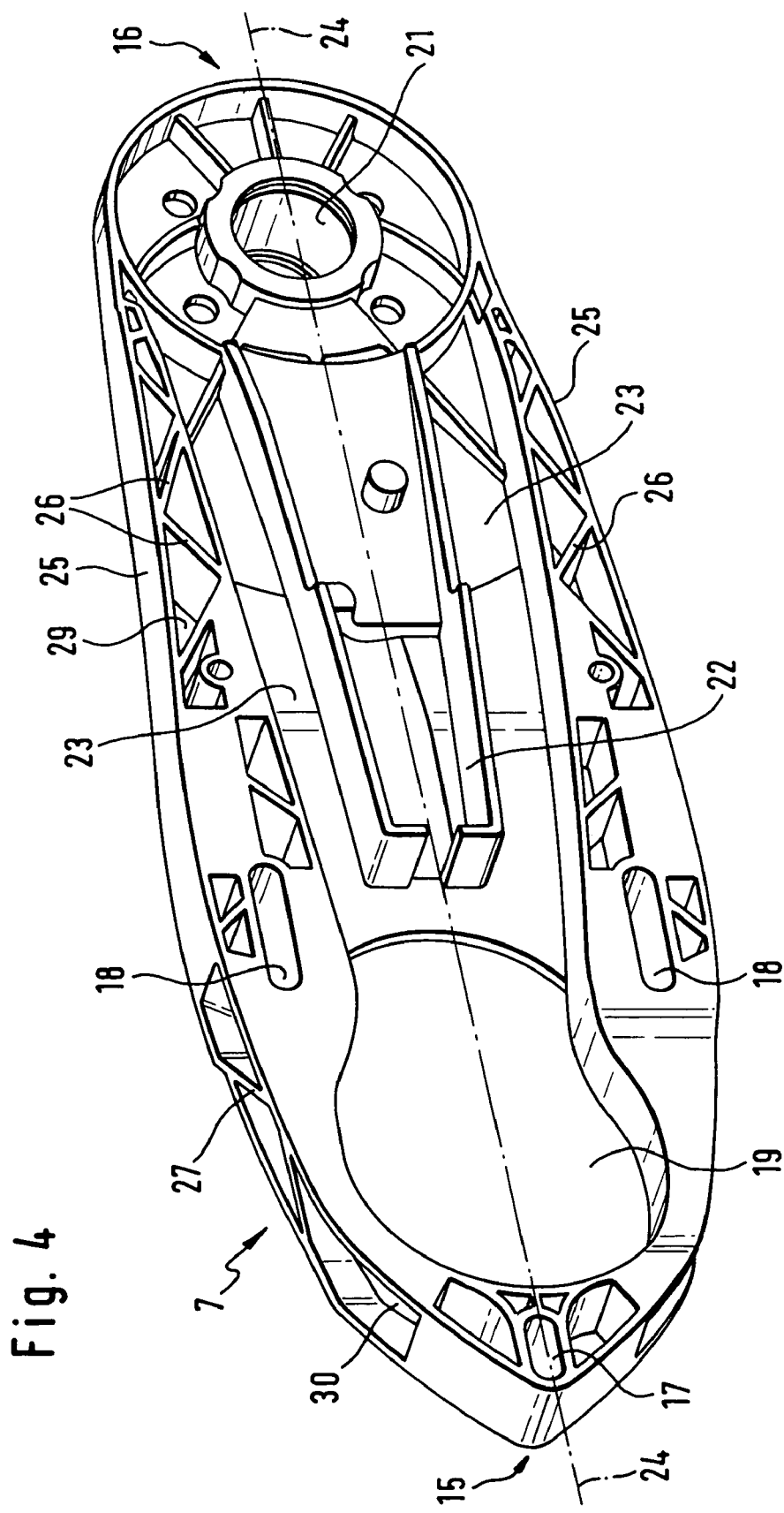

An embodiment of the invention is explained below with reference to the drawings, in which:

FIG. 1 shows a schematic side view of a parting-off grinder;

FIGS. 2/3 show schematic sections through the bracket of a parting-off grinder; and FIG. 4 shows a perspective view of the bracket of a parting-off grinder.

The cut-off machine or parting-off grinder 1 illustrated in FIG. 1 has a housing 6 with an upper handle 5 and a gripper bar 4. Fixed to the housing 6 is a bracket 7. The bracket 7 extends approximately in the direction of the upper handle 5 and at right angles to the gripper bar 4 past the area of the housing 6. In this arrangement a first end 15 of the bracket 7 is fixed to the housing 6 with screws 28. Positioned at the second end 16 of the bracket 7 facing away from the first end 15 is a parting-off wheel 2 which is mounted on the bracket 7 in such a manner that it is able to rotate about a spindle axis 14. The parting-off wheel 2 is partially enclosed by a protective hood 3. The bracket 7 is designed as one piece and, once the screws 28 have been loosened, can be moved in relation to the housing 6 along the slots or elongated holes 17 and 18.

FIG. 2 shows a schematic view of the bracket 7. The bracket 7 has an opening 19 at its first end 15. Positioned in the area of the opening 19 is a drive shaft 12, which is driven by the internal combustion engine of the parting-off grinder 1. Fixed to the drive shaft 12 is a drive wheel 11, which drives a belt pulley 9 via a belt 10. The belt pulley 9 is mounted on the side of the bracket 7 facing the housing 6 in the area of the second end 16 of the bracket 7. The belt 10, which is illustrated by means of a broken line in FIG. 2, thus extends approximately in the longitudinal direction of the bracket 7. The bracket 7 has a hub 21 in the area of the second end 16 in which is mounted a spindle 8. Fixed to the spindle 8 is the belt pulley 9. Fixed to the spindle 8 on the side of the bracket 7 facing away from the housing 6 opposite the belt pulley 9 is the parting-off wheel 2. In the area of the first end 15, the bracket 7 has an elongated hole 17 through which the screw 28 passes. In this arrangement the screw 28 is screwed into the housing 6.

FIG. 3 shows the bracket 7 rotated about the longitudinal direction 24 illustrated in FIG. 4 by 180°. The bracket 7 is designed to be symmetrical to a plane containing the axis of rotation 13 of the drive wheel 11 and the spindle axis 14. In FIG. 3 the drive shaft 12 passes through the opening 19. The drive wheel 11, the belt 10 and the belt pulley 9 are positioned on the side of the bracket 7 facing away from the housing 6 while the parting-off blade 2 is positioned on the opposite side facing the housing 6. Due to the symmetrical design, the bracket 7 can be reversed and is therefore suitable both for tools in which the parting-off wheel 2 is positioned on the inside, i.e. the side facing the housing 6, and for tools in which the parting-off wheel 2 is positioned on the outside.

FIG. 4 shows an enlarged perspective view of the bracket 7. Two guide channels 23 in which the belt runs during operation extend from the area of the opening 19 in the direction of the second end 16. In the area of the opening 19, elongated holes 18 are positioned in the edge areas of the bracket 7 between a guide channel 23 and the edge 25 of the bracket 7. The longitudinal holes 17, 18 extend in the longitudinal direction 24 of the bracket 7. Provided between the two guide channels 23 is a receiver 22 for a belt-tensioning device. In this arrangement, the belt-tensioning device comprises in particular a coil spring which can be positioned in the receiver 22. The belt-tensioning device operates between the bracket 7 and the housing 6 of the parting-off grinder 1.

The hub 21 positioned in the area of the second end 16 serves as a mount for the spindle 8. In particular, a bearing is positioned in the hub 21. The bracket 7 is designed to be symmetrical to a plane which lies perpendicular to the plane of the bracket 7. This means that the bracket 7 can also be fixed to the housing 6 in a position rotated about its longitudinal direction 24 by 180°, since this does not alter the positions of the elongated holes 17, 18 and the guide channels 23.

The bracket 7 is designed as a cast part. In order to achieve a bracket 7 of lightweight, numerous openings and recesses are provided. In order to increase rigidity, the bracket 7 has reinforcing struts in these openings and recesses. Thus, for example, reinforcing struts 26 are positioned in the openings 29 in the bracket 7 between the guide channels 23 and the edge 25. In this arrangement, the openings 29 run perpendicular to the plane formed by the bracket 7 in a direction parallel to the spindle axis 14. Recesses 30 extending from the edge 25 into the bracket 7 are provided in the area of the opening 19. Reinforcing struts 27 are positioned in these recesses 30.

The one-piece or monolithic design of the bracket 7 results in both high rigidity and high strength. Thanks to its design as a cast part with recesses and reinforcing struts it is possible to achieve a lightweight with high rigidity. The bracket may be fixed both to the outside of a tool and between two parts of a housing. Due to the one-piece design the bracket can easily be adjusted to the parting-off wheel diameter, thereby reducing vibrations.

The specification incorporates by reference the disclosure of German priority document 103 25 663.6 filed Jun. 6, 2003.

The present invention is, of course, in no way restricted to the specific disclosure of the specification and drawings, but also encompasses any modifications within the scope of the appended claims.

The invention claimed is:

1. A manually operated implement, comprising:
   a housing, and
   a monolithic bracket having a first end that is secureable to said housing in a first position and in a second position, wherein in said second position said bracket is rotated, about a longitudinal direction of said bracket, relative to said first position, by 180°, wherein said bracket has a second end on which is disposed a spindle for driving a tool, wherein said spindle is adapted to be driven by a drive wheel via a belt drive, wherein said bracket is provided with an opening in the vicinity of said first end of said bracket, and wherein said opening is disposed in the region of a drive shaft for said drive wheel.

2. An implement according to claim 1, wherein a fixing means is provided for securing said bracket to said housing, and wherein upon release of said fixing means, said bracket is adapted to be displaced on said housing within a prescribed range.

3. An implement according to claim 2, wherein said fixing means includes at least one slot formed in said bracket, and respective securing means extending through said slot.

4. An implement according to claim 1, wherein in a vicinity of its second end, said bracket is provided with a hub for a mounting of said spindle.

5. An implement according to claim 1, wherein said bracket is provided with a receiver for a belt-tensioning device.

6. An implement according to claim 5, wherein said bracket is provided with two guide channels for guiding said belt drive.

7. An implement according to claim 6, wherein said guide channels are disposed on opposite sides of said receiver approximately in a longitudinal direction of said bracket.

8. An implement according to claim 1, wherein said bracket is a cast part.

9. An implement according to claim 1, wherein said bracket is provided with a slot in the vicinity of said first end of said bracket, and wherein said slot is disposed adjacent to said opening on a side of said opening that is remote from said second end of said bracket.

10. A manually operated implement comprising:
    a housing, and
    a monolithic bracket having a first end that is secureable to said housing in at least two positions, and a second end on which is disposed a spindle for driving a tool, wherein said spindle is adapted to be driven by a drive wheel via a belt drive, wherein said bracket is provided with a receiver for a belt-tensioning device, wherein said bracket is provided with two guide channels for guiding said belt drive, and wherein said bracket is provided with reinforcing struts in at least one portion thereof.

11. An implement according to claim 10, wherein said bracket is provided with reinforcing struts in a region between one of said guide channels and an edge of said bracket.

12. An implement according to claim 10, wherein said bracket is provided with reinforcing struts at regions surrounding an opening provided in a vicinity of said first end of said bracket.

13. An implement according to claim 10, wherein said bracket is provided with an opening in a vicinity of said first end of said bracket.

14. An implement according to claim 13, wherein said bracket has a symmetrical configuration relative to a plane that contains an axis of rotation of said drive wheel and an axis of said spindle.

* * * * *